United States Patent [19]

Hotta et al.

[11] Patent Number: 4,887,800
[45] Date of Patent: Dec. 19, 1989

[54] TUYERE OF BLAST FURNACE

[75] Inventors: Hirohisa Hotta; Yotaro Oono; Masahiro Matsuura, all of Tokyo, Japan

[73] Assignee: Nippon Kokan Kabushiki Kaisha, Tokyo, Japan

[21] Appl. No.: 138,602

[22] Filed: Dec. 28, 1987

[30] Foreign Application Priority Data

Jan. 9, 1987 [JP] Japan ................................ 62-1856

[51] Int. Cl.$^4$ ............................................. C21C 5/48
[52] U.S. Cl. ..................... 266/270; 110/263; 239/132.3; 266/189; 266/222; 266/266; 266/267; 431/160
[58] Field of Search ............... 266/222, 266, 267, 270, 266/188, 189; 431/160; 110/263; 239/132.3

[56] References Cited

U.S. PATENT DOCUMENTS

| 296,225 | 4/1884 | Schulze-Berge | 239/132.3 |
|---|---|---|---|
| 1,518,854 | 12/1924 | Kirby | 75/41 |
| 1,849,718 | 3/1932 | Ledbetter | 266/270 |
| 2,650,161 | 8/1953 | Totzek | 75/41 |
| 2,920,001 | 1/1960 | Smith et al. | 239/132.3 |
| 3,350,084 | 10/1967 | Lucarell | 266/266 |
| 4,525,175 | 6/1985 | Stellaccio | 239/132.3 |
| 4,666,397 | 5/1987 | Wenning et al. | 431/160 |
| 4,736,693 | 4/1988 | Clomburg, Jr. | 431/160 |

FOREIGN PATENT DOCUMENTS

| 0026509 | 4/1981 | European Pat. Off. |  |
|---|---|---|---|
| 3334156 | 4/1984 | Fed. Rep. of Germany . |  |
| 1259738 | 3/1961 | France . |  |
| 2111135 | 6/1972 | France . |  |
| 2120474 | 8/1972 | France . |  |
| 52-32323 | 8/1977 | Japan . |  |
| 60-159104 | 8/1985 | Japan . |  |
| 39431 | 1/1961 | Luxembourg . |  |
| 273211 | 6/1927 | United Kingdom | 239/132.3 |
| 2165633 | 4/1985 | United Kingdom . |  |
| 2150155 | 6/1985 | United Kingdom . |  |
| 86-05520 | 9/1986 | World Int. Prop. O. . |  |

Primary Examiner—Robert McDowell
Attorney, Agent, or Firm—Frishauf, Holtz, Goodman & Woodward

[57] ABSTRACT

A tuyere for a blast furnace comprises water-cooled tuyere; and a burner removably mounted inside the water-cooled tuyere to burning pulverize coal. The burner comprises an inner pipe, an intermediate pipe and an outer pipe which are concentrically arranged. The inside of the inner pipe is used for a pulverized coal path, an oxygen feed path being in between the inner pipe and the intermediate pipe and a flame temperature control gas feed path in between the intermediate pipe and the outer pipe. The burner is equipped with a water-cooled jacket outside of the top end of the burner.

4 Claims, 1 Drawing Sheet

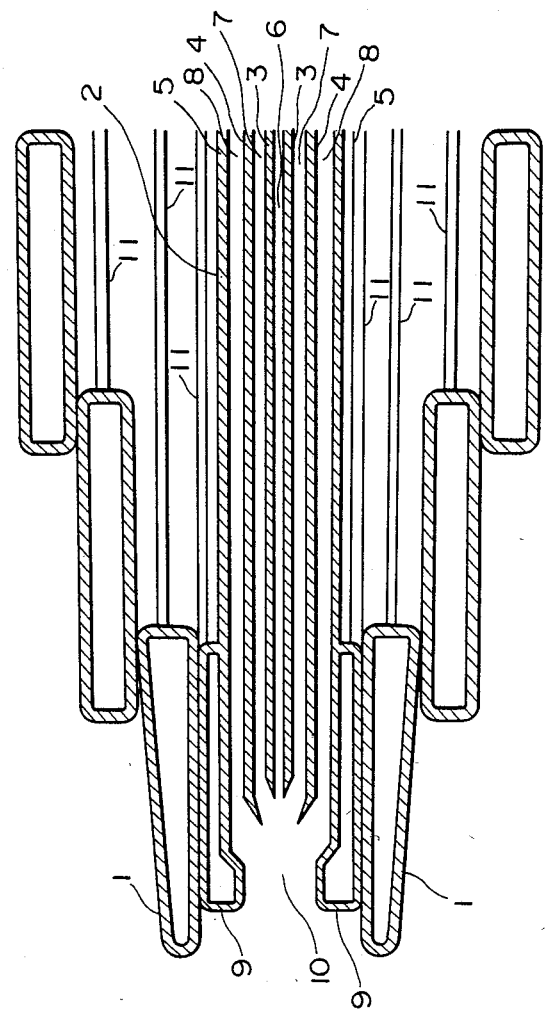

TUYERE OF BLAST FURNACE

BACKGROUND OF THE INVENTION

1. Field of the Invention

The present invention relates to a tuyere of a blast furnace for making pig iron, and, in particular, to a water-cooled tuyere of a blast furnace for blowing in pulverized coal.

2. Description of the Prior Arts

Recently, to improve productivity of a blast furnace or to make use of furnace top gas as a material for the synthetic chemical industry, various methods of allowing oxygen to be a major constituent of blast gas have been proposed. Japanese Examined patent publication (KOKOKU) No. 32323/77 discloses blowing in concentrated oxygen and gas reformed from furnace top gas. Another method is disclosed in a Japanese patent application laid open (KOKAI) No. 159104/85 wherein through tuyeres, oxygen and $H_2O$ or $CO_2$ as tuyere nose flame temperature control agents are blown in and, at the same time, gas which is free from $N_2$ is blown in through an intermediate level of a blast furnace. In the specification of this Japanese patent application, blow-in of pulverized coal of 100 kg/ton pig molten iron is disclosed, but there is no description of a method for blowing in pulverized coal. Furthermore, in a prior art blast furnace, pulverized coal is injected together with an appropriate carrier gas through hole openings of tuyeres, but the prior art method has difficulty in burning significant amounts of the pulverized coal.

SUMMARY OF THE INVENTION

It is an object of the present invention to provide a tuyere which allows a large amount of pulverized coal to perfectly combust.

In accordance with the present invention, a tuyere of a blast furnace comprises a water-cooled tuyere and a burner removably fitted in the inside of the water-cooled tuyere.

BRIEF DESCRIPTION OF THE DRAWING

FIG. 1 is a vertical sectional view showing an embodiment of a water-cooled tuyere of a blast furnace, for blown pulverized coal into the blast furnace, according to the present invention.

DESCRIPTION OF THE PREFERRED EMBODIMENT

With reference to FIG. 1, an embodiment of a water-cooled tuyere of a blast furnace of the present invention will now be described. Burner 2 is fit inside of a water-cooled tuyere 1. Burner 2 comprises inner pipe 3, intermediate pipe 4 and outer pipe 5, which are concentrically arranged so as to form concentric circles. A feed path 6 for pulverized coal is provided inside inner pipe 3, a feed path 7 for oxygen gas is provided between inner pipe 3 and intermediate pipe 4, and a feed path 8 for tuyere nose flame temperature control gas is provided in between intermediate pipe 4 and outer pipe 5. Through oxygen path 7, gas of 40 vol.% or more oxygen passes. Any one gas selected from the group consisting of circulated blast furnace gas, $CO_2$ gas and steam passes through a feed path 8 for tuyure nose flame temperature control gas. Water-cooled jacket 9 is positioned against the inner surface of the water-cooled tuyere, thus keeping the inside of a blast furnace tightly sealed. At the top end of burner 2, jet-outing opening 10 is arranged so as to jet out perfectly mixed pulverized coal, oxygen and tuyere nose flame temperature control gas into a blast furnace. Owing to this perfect mixing, the pulverized coal is perfectly combusted. Water-cooled tuyere 1 and jacket 9 are cooled by water supplied through cooling water feed pipe 11.

The reason why the water-cooled tuyere 1 and water-cooled jacket 9 are set at the top end of burner 2 in an overlapped manner will be now described. A tuyere through which oxygen and tuyere nose flame temperature control gas are blown in causes comparatively little trouble in operation. However, a tuyere through which oxygen, tuyere nose flame temperature control gas and pulverized coal are blown in is more apt to bring about troubles in operation. In this respect, the overlapped tuyere structure of the present invention minimizes the occurence of trouble, and, in the case of trouble, enables replacing a troubling burner with another burner in a short time with exactness.

Lastly, a method of operating a blast furnace by using the tuyere with the overlapped cooling-jacket structure of the present invention will be described. Iron ores and cokes are charged through a furnace top into a blast furnace. Through the tuyere set in at the lower part of the blast furnace, gas of 40 vol.% or more oxygen, tuyere nose flame temperature control gas and pulverized coal are blown into the blast furnace. Through blow-in inlets set in a furnace shaft, preheating gas is introduced into the blast furnace, and burdens charged into the blast furnace are preheated. Through the mentioned process, thanks to oxygen blown in through the tuyere, cokes and pulverized coal are perfectly combusted, and, the reducing gas thus generated therefrom melts and reduces the iron ores into molten pig iron and slag.

As described in the foregoing, when a tuyere which has a structure of the present invention is used for blowing pulverized coal operation, into a furnace in a usual type of as usual, and tuyere of the present invention realizes not only perfect combustion of pulverized coal, but also enables quick and precise replacement of a troubling oxygen burner.

What is claimed is:

1. Apparatus for blowing pulverized coal into a blast furnace, comprising:
   a water-cooled tuyere having a water-cooled jacket means for containing cooling water;
   burner means removably mounted inside of a receiving space of said water-cooled jacket means of said water-cooled tuyere for burning pulverized coal, said burner means having an outlet end having an outlet opening;
   said burner means including:
      an inner feed pipe, an intermediate pipe and an outer pipe which are all concentrically arranged so as to form concentric spaced apart circles in cross section;
      said inner feed pipe having an inner space defining an inner feed path for feeding said pulverized coal;
      an intermediate feed path for feeding oxygen being defined by a space formed between said inner feed pipe and said intermediate pipe; and
      an outer feed path for feeding tuyere nose flame temperature control gas being defined by a space between said intermediate pipe and said outer pipe;

said outlet opening of said burner means including a jetting-out opening at said outlet end of said burner means, in communication with said feed paths, for mixing said pulverized coal with said oxygen gas and said tuyere nose temperature control gas; and said burner means including a water-cooled jacket means arranged at least around the outside of said outlet end of said burner means and inside of and adjacent to said water-cooled jacket means of said water-cooled tuyere so as to provide an overlapped structure, for cooling said outlet end of said burner means, said water-cooled jacket means of said burner means being substantially completely overlapped with and independent of said water-cooled jacket means of said water-cooled tuyere when said burner means is in said receiving space of said water-cooled jacket means, and said burner means and its water-cooled jacket means being slidably removable as a unit from said receiving space of said water-cooled jacket means of said water-cooled tuyere.

2. The apparatus of claim 1, further comprising means for feeding oxygen gas into said intermediate feed path, said oxygen gas having an oxygen concentration of at least 40 vol. %.

3. The apparatus of claim 1, further comprising means for feeding a gas into said outer fed path, said gas being any one selected from the group consisting of circulated blast furnace gas, $CO_2$ gas and steam.

4. The apparatus of claim 1, wherein:
said water-cooled jacket means of said tuyere has an inner surface defining said receiving space;
said water-cooled jacket means of said burner means has an outer surface which is slidably fitted closely against said inner surface of said water-cooled jacket means of said tuyere; and
said inner and outer surfaces being overlapped with each other when said burner means is received in said receiving space.

* * * * *

UNITED STATES PATENT AND TRADEMARK OFFICE
CERTIFICATE OF CORRECTION

PATENT NO.  : 4,887,800
DATED       : December 19, 1989
INVENTOR(S) : HOTTA et al It is certified that error appears in the above-identified patent and that said Letters Patent is hereby corrected as shown below:

Title page:

Abstract, line 4, "to" should read --for--.

Column 2, lines 39-40, should read

--ing pulverized coal into a furnace in a usual type of operation, the tuyere of the present invention--.

Signed and Sealed this

Sixth Day of August, 1991

Attest:

HARRY F. MANBECK, JR.

Attesting Officer

Commissioner of Patents and Trademarks